United States Patent
Matay et al.

(10) Patent No.: US 6,910,429 B1
(45) Date of Patent: Jun. 28, 2005

(54) ATTACHABLE MECHANIC'S ACCESSORY TRAY

(76) Inventors: Will J. Matay, 7229 Donnelly Ave., San Gabriel, CA (US) 91775; Paul R. Castro, 272 La Verne Ave., Pomona, CA (US) 91767

( * ) Notice: Subject to any disclaimer, the term of this patent is extended or adjusted under 35 U.S.C. 154(b) by 319 days.

(21) Appl. No.: 10/310,355

(22) Filed: Dec. 5, 2002

Related U.S. Application Data
(60) Provisional application No. 60/341,696, filed on Dec. 18, 2001.

(51) Int. Cl.[7] .............................................. A47B 23/00
(52) U.S. Cl. ......................................... 108/44; 108/152
(58) Field of Search .............................. 108/44, 48, 49, 108/47, 152; 248/316.1, 316.7, 207, 206.5; 224/547, 562, 564; 206/350, 373, 372

(56) References Cited

U.S. PATENT DOCUMENTS

| | | | | |
|---|---|---|---|---|
| 598,895 A | * | 2/1898 | Bell ........................... | 108/152 |
| 1,295,182 A | * | 2/1919 | Markwood .................. | 108/152 |
| 1,316,031 A | * | 9/1919 | Hartig ........................ | 108/152 |
| 2,713,530 A | * | 7/1955 | Chisholm ................... | 108/152 |
| 3,107,636 A | * | 10/1963 | Knight ........................ | 108/152 |
| 3,822,847 A | * | 7/1974 | Emmons ..................... | 108/152 |
| 5,052,581 A | | 10/1991 | Christ et al. | |
| 5,069,375 A | * | 12/1991 | Flick ........................... | 108/44 |
| 5,699,910 A | * | 12/1997 | Kubat ......................... | 206/373 |
| D401,490 S | | 11/1998 | Teixeira | |
| 5,873,311 A | * | 2/1999 | Schlattl ....................... | 108/44 |
| 5,937,766 A | * | 8/1999 | Denny ......................... | 108/44 |
| 5,967,259 A | | 10/1999 | Williams | |
| D433,568 S | | 11/2000 | Willison | |
| 6,237,799 B1 | | 5/2001 | Emerson | |
| 6,240,856 B1 | | 6/2001 | Paskey et al. | |
| 6,571,669 B2 | * | 6/2003 | Benatz et al. .............. | 206/350 |
| 6,748,874 B2 | * | 6/2004 | Gawronski ................. | 108/152 |

* cited by examiner

Primary Examiner—Jose V. Chen
(74) Attorney, Agent, or Firm—Gordon K. Anderson

(57) ABSTRACT

An accessory tray (10) for attachment to a solid surface is described that is used to hold tools, materials and accessories in a convenient location for mechanics or other types of workers. The accessory tray incorporates a support tray (12) having an item holding area (36) on the upper side. A raised perimeter wall (26, 28, 30 and 32) peripherally surrounds the support tray, for maintaining the tools, materials and accessories within the item holding area. A clamping attachment assembly (14) is rotatably attached to the support tray with a locking device defined as a swivel joint assembly (16) allowing the tray to be positioned in a horizontal plane relative to the clamping attachment assembly when the clamping attachment assembly is affixed to a rigid object within a specific workplace.

15 Claims, 2 Drawing Sheets

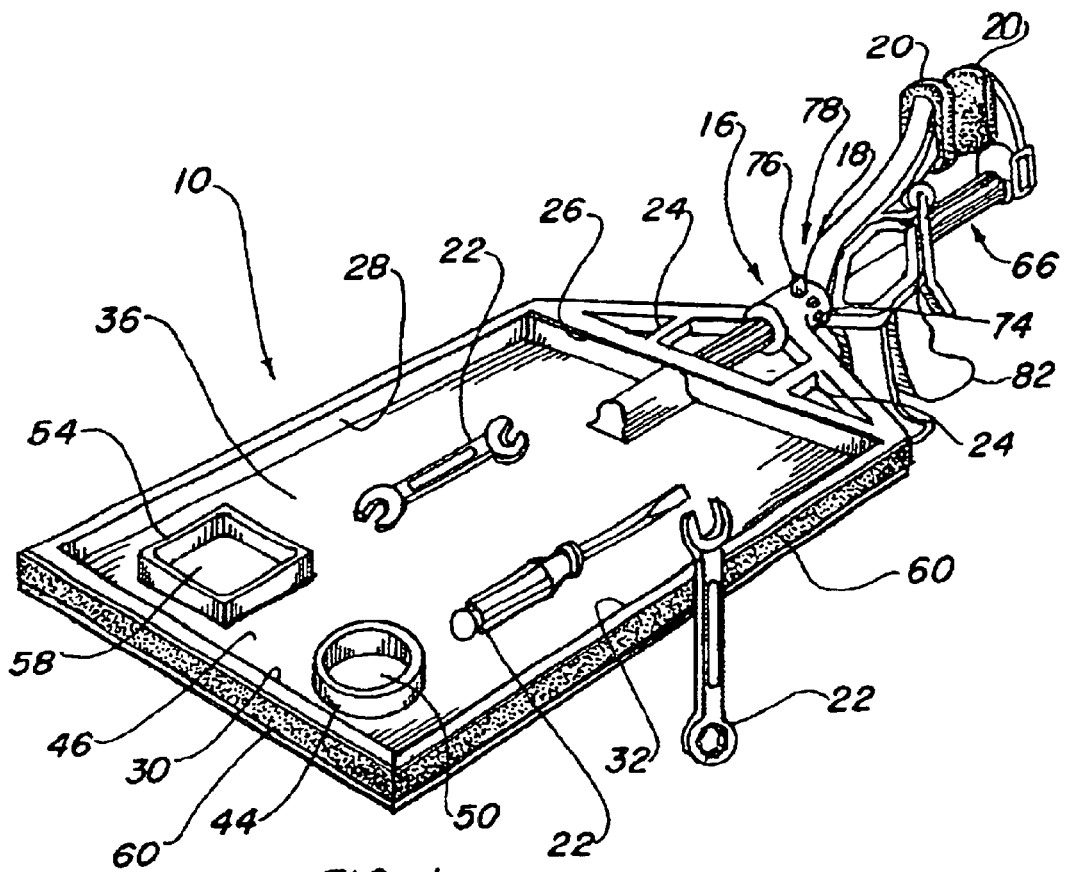
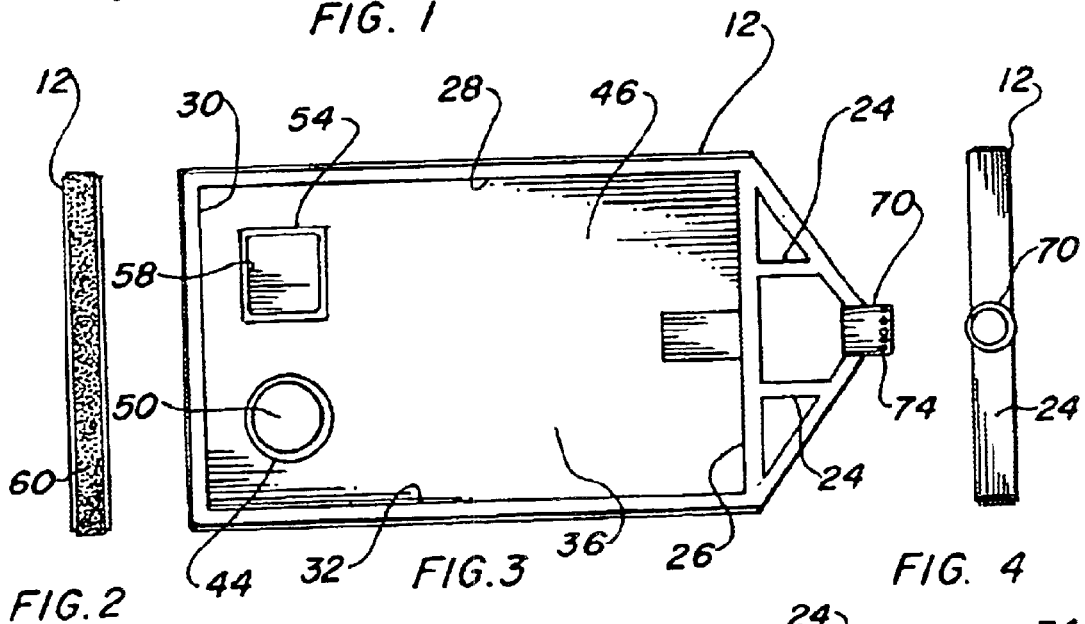
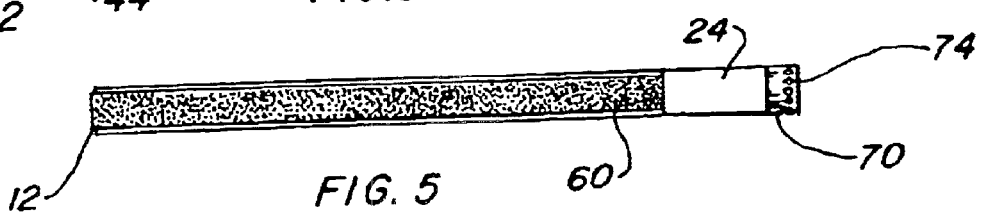

ATTACHABLE MECHANIC'S ACCESSORY TRAY

CROSS REFERENCE TO RELATED APPLICATION

This application claims priority of Provisional Patent Application Ser. No. 60/341,696 filed Dec. 18, 2001.

TECHNICAL FIELD

The present invention relates to a holding tray for mechanics or workers accessories in general. More specifically to a system that includes a support tray assembly for holding items used by a mechanic or craftsman that is connected to an attachment adaptable for connection to rigid structure on a vehicle or the like.

BACKGROUND ART

Previously, many types of trays have been used in endeavoring to provide an effective means to hold items in a convenient location while working with tools or other objects and accessories.

The prior art listed below did not disclose patents that possess any of the novelty of the instant invention; however the following U.S. patents are considered related:

| U.S. Pat. No. | Inventor | Issue Date |
| --- | --- | --- |
| D401,490 | Tiexeira | Nov. 24, 1998 |
| D433,568 | Willison | Nov. 14, 2000 |
| 5,502,581 | Christ et al. | Oct. 1, 1991 |
| 5,967,259 | Williams | Oct. 19, 1999 |
| 6,237,799 | Emerson | May 29, 2001 |
| 6,240,856 | Paskey et al. | Jun. 5, 2001 |

Teixeira in U.S. design Pat. No. D401,490 illustrates the ornamental design for an automobile mounted mechanics tool tray which apparently incorporates a magnetic bar with a mounting bracket on each end that rests on a steel portion of the vehicle and is used to hold the tools in place using the attraction of the magnet.

Willison in U.S. design Pat. No. D433,568 illustrates two embodiments of a tool tray having sloped sides that are raised above a segmented tray base with an egg create type of resilient foam material on the bottom providing a soft surface underneath.

U.S. Pat. No. 5,052,581 issued to Christ et al. is for a support tray for a ladder or scaffold that includes a load-bearing support bar or strut that is secured to the attaching structure below the tray. The support structure is adjustable in length and utilizes a C-clamp for securement.

U.S. Pat. No. 5,967,259 issued to Williams is for a utility tray for use in conjunction with a conventional stepladder having a flat top. The tray includes a flat central portion with compartments on opposite sides and a rear tray compartment having holes to receive liquid containing vessels. The underside of the tray is configured to conform to the flange of the top-step receiving compartment and a strap releasably secures the tray to the stepladder.

Emerson in U.S. Pat. No. 6,237,799 discloses a utility tray with a planar base and an upright flange from at least three side edges. The tray is attached to a support structure such as a bed frame with a threaded bolt that extends through a bar member on the lower surface of the tray to frictionally engage the support structure.

Paskey et al. in U.S. Pat. No. 6,240,856 teach a vehicle tray with a T-shaped base mounted on casters. A vertical post, having two telescoping members, is locked together at the desired height. The tray is supported on angle irons and a crossbeam in a cantilever fashion. The tray includes a drawer mounted on slides and is configured to permit working in a vehicle with the hood open.

DISCLOSURE OF THE INVENTION

It is often necessary for mechanics or other workman to utilize a variety of tools and other items while performing a task. Although the worker may need a large number of tools to perform a task quickly and effectively, it is often difficult to have a place to position these items in a location where they are readily retrievable when needed.

It is therefore a primary object of the invention to utilize an accessory tray that is attached to a rigid component of a vehicle, or a similar structure providing a flat surface for holding the tools and accessories where required for complete accessibility. This accessory tray further includes a raised perimeter edge wall that defines an enclosed area within its parameters and is used for retaining such items normally used by a mechanic, or some other type of worker, which normally requires a number of hand tools and accessories to accomplish a given task.

In order to increase the utility of the invention still another object of the invention is realized that includes a magnetic strip in the form of a ceramic magnet rack or flexible magnetic tape attached with pressure sensitive adhesive to the outside perimeter of the edge wall on one or more of the sides. The magnetic strip has sufficient ferrous metal attraction to hold a hand tool such as a wrench or screwdriver in place on the side for convenient retrieval.

Because a mechanic or worker may wish to have a beverage while working it is yet another object of the invention to include some means for holding a beverage without slipping or tipping. The tray therefore includes the incorporation of a raised circular beverage holder structure that extends from a bottom surface of the tray's enclosed area that is high enough to preclude the cup or can from tipping when retained.

A further object of the invention is realized since a typical procedure for a mechanic is to remove large numbers of individual fasteners it is advantageous to include a designated area for storing such items so as to be able to readily retrieve them when needed. This object of the invention is realized by including a second raised structure that extends upward from the top surface of the enclosed area and is defined as a part confinement area for retaining these items such as screws, nuts, bolts etc.

Another object of the invention is embodied in the tray connection that includes a clamping attachment adapted to be connected to a rigid structure on a vehicle or some other conveniently located surface. The clamping attachment consists of a modified type of bar clamp that conventionally is used to compress structure between a pair of jaws. The invention is not limited to the type or style of clamp however three embodiments are presently preferred which include: a pistol grip type clamp, a sliding bar clamp with a wing nut screwing a movable head and a plier jaw clamp using the principal of conventional locking pliers along with a rod integrally formed on one of the handles.

Since the clamping attachment cannot always be parallel with the tray on a flat horizontal plane, the clamping attachment includes a swivel joint that is lockable to allow the worker to position the tray portion of the support assembly at a useable selected angle regardless of its attaching angle, allowing the tools and other items to be supported in a flat position. The swivel joint includes a tubular section that is connected to the tray and an insert rod extends from the attachment portion. The tubular section has a plurality of locking pin receiving holes formed around its circumference that are sized to allow a spring locking pin, of a locking pin assembly provided on the insert rod, to be manually depressed while rotating the tray to the desired angle. The locking pin is then released allowing it to seat within the locking pin receiving holes, thereby securing the tray in a fixed position in relation to the attachment assembly.

A final object of the invention is the simplicity of construction as the tray may integrally injection molded of thermoplastic or made of formed sheet metal with thermoplastic or cast metal stabilizer bars. Either method of construction permits the mechanic accessory tray to be produced in a cost effective manner making it economically within the reach of many users.

These and other objects and advantages of the present invention will become apparent from the subsequent detailed description of the preferred embodiment and the appended claims taken in conjunction with the accompanying drawings.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a partial isometric view of the preferred embodiment of the mechanic's accessory tray of the present invention.

FIG. 2 is a left end view of the tray portion of the preferred embodiment completely removed from the assembly for clarity.

FIG. 3 is a top plan view of the tray portion of the preferred embodiment completely removed from the assembly for clarity.

FIG. 4 is a right end view of the tray portion of the preferred embodiment completely removed from the assembly for clarity.

FIG. 5 is a front view of the tray portion of the preferred embodiment completely removed from the assembly for clarity.

BEST MODE FOR CARRYING OUT THE INVENTION

Figure 6:
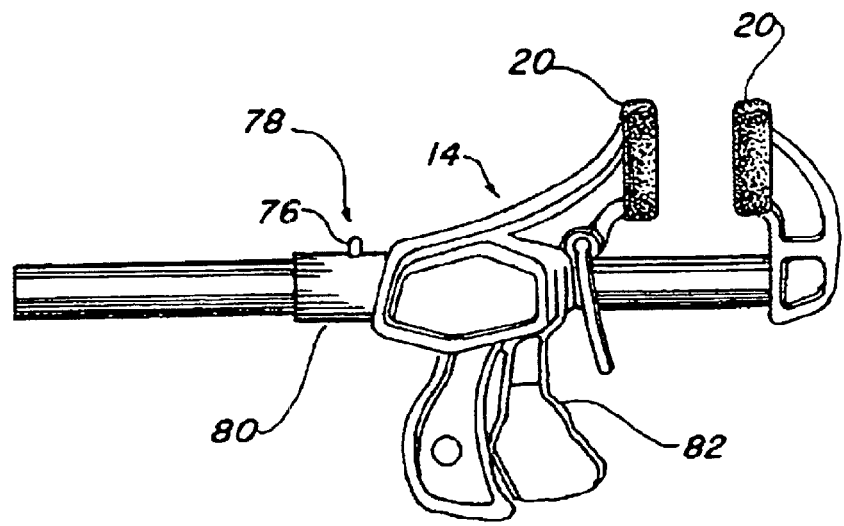
FIG. 6 is a side view of the clamping attachment assembly in the preferred embodiment which is a pistol grip bar clamp, which has been removed from the assembly for clarity.

The best mode for carrying out the invention is presented in terms of a preferred embodiment. This preferred embodiment is shown in FIGS. 1 thorough 8 however it includes a first, second and third embodiment of the clamping attachment assembly. There are two major segment of the preferred embodiment of the attachable mechanic's accessory tray 10 shown best in FIG. 1, consisting of a support tray 12 and a clamping attachment assembly 14.

The support tray 12 includes an item holding area 36 that is contained within the inside flat top surface of the tray. The holding area 36 is configured to accommodate tools 22, materials and accessories. FIG. 1 illustrates some representative tools 22 such as a screwdriver an open-end wrench and a combination wrench. The support tray 12 further has, at least one raised circular ring-shaped beverage holder structure 44 within a bottom surface 46 of the support tray 12 forming a cup and beverage holder 50. It will be noted that the bottom surface 46, is in reality the upper horizontal surface of the item supporting area 36 of the support tray 12, however it additionally forms the bottom of the cup and beverage holder 50. FIG. 1 depicts only one beverage holder 50, however any number may be added if desired. The beverage holder structure 44 is preferably formed of the same material as the tray 12 extending high enough from the bottom surface 46 to preclude the cup or beverage can from tipping when retained, even if the tray is tilted slightly or bumped by the user.

The support tray 12 also includes, at least one second raised perimeter wall 54 forming a fastener holding area 58 for screws, nuts and bolts etc. Again only one perimeter wall 54 is illustrated in the drawings but any number could be added to allow various types of fasteners or items to be stored separately. The height of the second raised perimeter wall 54 is selected to accommodate the particular type of fastener or accessory as required by the application. While a square shape is illustrated, rectangular, round, oval or any polygonal shape may be used.

A raised perimeter wall peripherally surrounds the support tray 12, for maintaining the tools 22, materials and accessories within the item holding area 36. This raised perimeter wall surrounds the entire tray 12 and consists of a right end raised perimeter wall 26, a back raised perimeter wall 28, a left end raised perimeter wall 30 and a front raised perimeter wall 32. The raised perimeter walls 26, 28, 30 and 32 are preferably formed integrally with the support tray 12 as illustrated in FIGS. 1–5, however they may be attached separately if desired.

The raised perimeter walls 28, 30 and 32 may include a magnetic strip 60 that is disposed upon the outside surface for temporarily holding a ferrous metal tool 22 or accessory permitting quick retrieval. The magnetic strip 60 may be in the form of a ceramic magnet rack or flexible magnetic tape attached with pressure sensitive adhesive as illustrated. The limiting factor in selection of the magnetic strip 60 is that it must have sufficient ferrous metal attraction, or magnetism, to hold a conventional hand tool such as a wrench or screwdriver in place on the side in a vertical or angular position for convenient retrieval by the mechanic or worker. The magnetic strip 60 may utilize ceramic, barium ferrite, rare earth materials or so called ALNICO 5 which is a composition of carbon free aluminum-nickel-cobalt and steel alloy or any other magnetic substance.

The clamping attachment assembly 14 is rotatably attached to the support tray 12 with locking means 18 defined as a swivel joint assembly 16 allowing the tray 12 to be essentially positioned in a horizontal plane relative to the clamping attachment assembly 14 when the clamping attachment assembly 14 is affixed to a rigid object within a specific workplace.

The clamping attachment assembly consists of, an adjustable locking mechanism 66 defined as a tubular section 70 that is integrally formed within the support tray 12. The tubular section 70 has a plurality of locking holes 74 around its outward portion as illustrated in FIGS. 1, 3 and 5. A spring loaded locking pin 78 is positioned within the clamping attachment assembly 14 and includes an extending pin 76 interfacing with the locking holes 74 in the tubular section 70 of the locking mechanism 66. This arrangement permits adjusting the horizontal plane of the tray 12 relative to the clamping attachment assembly 14.

As previously described, only in greater detail, as the clamping attachment assembly 14 is not consistently rotatably positioned parallel to the tray 12 providing a flat horizontal surface, the swivel joint assembly 16 permits the user to position the tray 12 at a useable selected angle regardless of its attaching angle, allowing the tools 22 and other items to be supported in a flat position. The tubular section 70 is connected to the tray 12 and receives an insert rod portion 80 that extends from the clamping attachment assembly. As the tubular section 70 has a plurality of locking pin receiving holes 74 formed around its circumference, the extending pin 76, of a spring loaded locking pin assembly 78 permits the user to depress the extending pin 76 while rotating the tray 12 to the desired angle. The extending pin 76 is then released allowing it to seat within the locking pin receiving holes 74, thereby securing the tray in a fixed position in relation to the attachment assembly.

The tubular section 70 of the clamping attachment assembly 14 incorporates a plurality of stabilizer bars 24 formed within, or attached to, the support tray 12, for positioning the tubular section 70 in the center of the support tray 12 while sustaining the structural integrity of the tubular section 70 in a position away from the tray right end perimeter wall 26. The stabilizer bars 24 are illustrated in FIGS. 1 and 3–5 and may be formed integrally with the support tray 12 or made of a similar material and attached by methods well known in the art.

Figure 7:
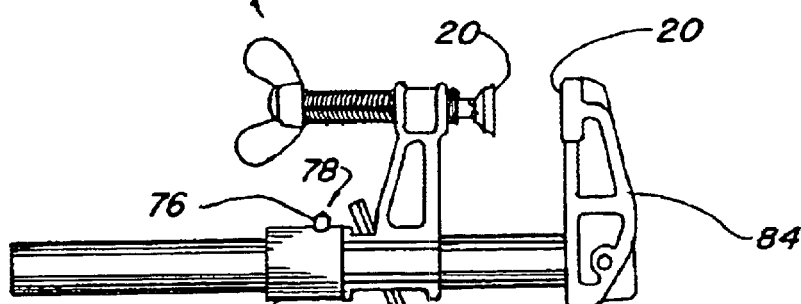
FIG. 7 is a side view of the clamping attachment assembly in the second embodiment which is a sliding bar clamp, which has been removed from the assembly for clarity.
Figure 8:
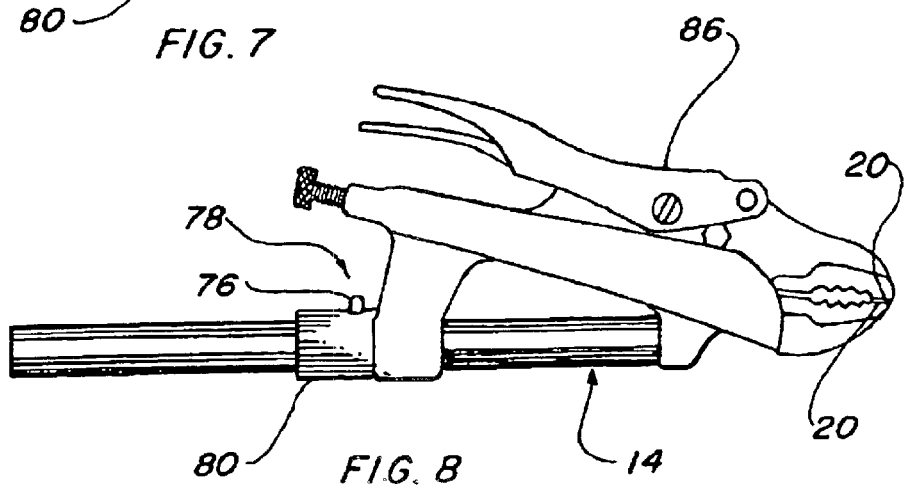
FIG. 8 is a side view of the clamping attachment assembly in the third embodiment which is a plier jaw bar clamp, which has been removed from the assembly for clarity.

The clamping attachment assembly 14 further incorporates the use of a separate modified conventional bar clamp, having a pair of opposed jaws 20 that are capable of griping onto a stationary object on the workplace and holding the entire tray 10 securely. There are many types of bar clamps available in today's marketplace and many types and styles may be utilized with equal ease, such as toggle clamps, L-clamps, C-clamps etc. It is however, preferred to utilize either a pistol grip bar clamp 82 illustrated in FIGS. 1 and 6, sliding head bar clamp 84 depicted pictorially in FIG. 7 or a plier jaw bar clamp 86 shown in FIG. 8. It should be noted that the commonly used pistol grip bar clamp 82 is known by its registered trademark "QUICK-GRIP" as manufactured by the American Tool Companies Inc. It may be easily realized that the clamping assembly of each clamp is capable of gripping a rigid surface using the clamp jaws 20, either resilient as shown in FIGS. 1 and 6, or metallic as illustrated in the other figures.

Since considerable structural strength is mandated the attachable mechanic's accessory tray 10 may be fabricated integrally of an injection molded thermoplastic or produced of formed metal sheet using thermoplastic or metal stabilizer bars 24 including the tubular section 70, with either method of construction permitting the mechanic accessory tray 10 to be produced in a cost effective manner.

It is noted that the embodiment of the attachable mechanic's accessory tray 10 described herein in detail for exemplary purposes is of course subject to many different variations in structure, design, application and methodology. Because many varying and different embodiments may be made within the scope to the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An attachable mechanic's accessory tray for holding tools, materials and accessories in a convenient location for mechanics, or a variety of other types of workers, comprising,
    a support tray having an item holding area contained within, said holding area configured to accommodate tools, materials and accessories,
    a raised perimeter wall peripherally surrounding the support tray, for maintaining the tools, materials and accessories within the item holding area, and
    a clamping attachment assembly rotatably attached to the support tray with locking means defined as a swivel joint assembly allowing the tray to be essentially positioned in a horizontal plane relative to the clamping attachment assembly when the clamping attachment assembly is affixed to a rigid object within a specific workplace, wherein said clamping attachment assembly further comprises, an adjustable locking mechanism defined as a tubular section integrally formed within the support tray and said tubular section having a plurality of locking holes disposed around a outward portion thereof.

2. The attachable mechanic's accessory tray as recited in claim 1 wherein said support tray further comprises, at least one raised circular ring-shaped beverage holder structure within a bottom surface of the support tray forming a cup and beverage holder.

3. The attachable mechanic's accessory tray as recited in claim 1 wherein said support tray further comprises, at least one second raised perimeter wall forming a fastener holding area for screws, nuts and bolts etc.

4. The attachable mechanic's accessory tray as recited in claim 1 wherein said a raised perimeter wall further comprises, a magnetic strip disposed upon an outside surface for temporarily holding a ferrous metal tool or accessory permitting quick retrieval.

5. The attachable mechanic's accessory tray as recited in claim 1 wherein said raised perimeter wall is formed integrally with said support tray.

6. The attachable mechanic's accessory tray as recited in claim 1 wherein said clamping attachment assembly having a spring loaded locking pin positioned within said clamping attachment assembly including an extending pin interfacing with said locking holes in the tubular section of the locking mechanism for adjusting the horizontal plane of the tray relative to the clamping attachment assembly.

7. The attachable mechanic's accessory tray as recited in claim 1 wherein said clamping attachment assembly tubular section further comprises stabilizer bars formed within the support tray, for positioning the tubular section in the center of the support tray and sustaining the tubular section in a position away from the tray perimeter wall.

8. The attachable mechanic's accessory tray as recited in claim 1 wherein said clamping attachment assembly further comprises an insert rod portion rotatably interfacing with the tubular section having the spring loaded locking pin housed within.

9. The attachable mechanic's accessory tray as recited in claim 1 wherein said clamping attachment assembly further comprises a pistol grip bar clamp capable of gripping onto a stationary object on a workplace and holding the tray securely.

10. The attachable mechanic's accessory tray as recited in claim 1 wherein said clamping attachment assembly further comprises a sliding head bar clamp capable of gripping onto a stationary object on a workplace and holding the tray securely.

11. The attachable mechanic's accessory tray as recited in claim 1 wherein said clamping attachment assembly further comprises a plier jaw clamp capable of gripping onto a stationary object on a workplace and holding the tray securely.

12. The attachable mechanic's accessory tray as recited in claim 1 wherein said support tray is formed of thermoplastic.

13. The attachable mechanic's accessory tray as recited in claim 1 wherein said support tray is formed of metal.

14. An attachable mechanic's accessory tray for holding tools, materials and accessories in a convenient location for mechanics or a variety of workers comprising, a) an essentially flat support tray for accommodating tools, materials and accessories, b) a raised perimeter wall peripherally surrounding the support tray, for maintaining the tools, materials and accessories within the tray, and c) a clamping attachment assembly rotatably attached to the support tray allowing the tray to be positioned in a horizontal plane relative to the clamping attachment assembly when the accessory tray is affixed to a rigid object within a workplace, wherein said clamping attachment assembly further comprises, an adjustable locking mechanism defined as a tubular section integrally formed within the support tray and said tubular section having a plurality of locking holes disposed around a outward portion thereof.

15. An attachable mechanic's accessory tray for holding tools, materials and accessories in a convenient location for mechanics or a variety of workers comprising, a support tray for accommodating tools, materials and accessories having a raised perimeter wall peripherally surrounding the support tray, for maintaining the tools, materials and accessories within the tray, and clamping means affixed to a rigid object within a workplace allowing the tray to be rotatably positioned in a horizontal plane relative to the clamping means, wherein said clamping attachment assembly further comprises a modified pistol grip bar clamp capable of gripping onto a stationary object on a workplace and holding the tray securely.

* * * * *